(12) United States Patent
Ma et al.

(10) Patent No.: US 12,032,488 B1
(45) Date of Patent: Jul. 9, 2024

(54) CIRCUIT AND METHOD FOR TRANSLATION LOOKASIDE BUFFER (TLB) IMPLEMENTATION

(71) Applicant: Marvell Asia Pte Ltd, Singapore (SG)

(72) Inventors: Albert Ma, Belmont, MA (US); Oded Tsur, Haifa (IL)

(73) Assignee: Marvell Asia Pte Ltd, Singapore (SG)

( * ) Notice: Subject to any disclaimer, the term of this patent is extended or adjusted under 35 U.S.C. 154(b) by 123 days.

(21) Appl. No.: 17/932,135

(22) Filed: Sep. 14, 2022

(51) Int. Cl.
*G06F 12/1027* (2016.01)
*G06F 12/0864* (2016.01)
*G06F 12/1009* (2016.01)

(52) U.S. Cl.
CPC ...... *G06F 12/1027* (2013.01); *G06F 12/0864* (2013.01); *G06F 12/1009* (2013.01)

(58) Field of Classification Search
CPC ............. G06F 12/1027; G06F 12/0864; G06F 12/1009
See application file for complete search history.

(56) References Cited

U.S. PATENT DOCUMENTS

| | | | | |
|---|---|---|---|---|
| 4,612,612 A | * | 9/1986 | Woffinden | G06F 12/1063 711/3 |
| 9,208,103 B2 | | 12/2015 | Kessler et al. | |
| 9,268,694 B2 | | 2/2016 | Snyder, II et al. | |
| 9,639,476 B2 | | 5/2017 | Chin et al. | |
| 2003/0182532 A1 | * | 9/2003 | Park | G06F 12/1027 711/207 |
| 2017/0206171 A1 | | 7/2017 | Mukherjee et al. | |
| 2021/0049107 A1 | * | 2/2021 | Campbell | G06F 12/1009 |

OTHER PUBLICATIONS

Lee et al., A Banked-Promotion TLB for High Performance and Low Power, 2001, IEEE, pp.118-123 (Year: 2001).*
Arm, "Armv8-A Address Translation," Version I.I, 2017-2019.
"Translation lookaside buffer," Wikipedia, Retrieved from the Internet at https://en.wikipedia.org/wiki/Translation_lookaside_buffer on Aug. 16, 2022.
Halpin, et al., "Skewed-Associative Caches: CS752 Final Project," Dec. 13, 2002.
Hagoort, "How is Virtual Memory Translated to Physical Memory?" Mar. 3, 2020; Retrieved from the Internet at https://blogs.vmware.com/vsphere/2020/03/how-is-virtual-memory-translated-to-physical-memory.html on Sep. 7, 2022.

* cited by examiner

*Primary Examiner* — Gary W. Cygiel
(74) *Attorney, Agent, or Firm* — Hamilton, Brook, Smith & Reynolds, P.C.

(57) ABSTRACT

A circuit and corresponding method provide a translation lookaside buffer (TLB) implementation. The circuit comprises a plurality of TLB banks and TLB logic. The TLB logic computes a plurality of hash values of a tag included in a memory request. The TLB logic locates, based on hash values of the plurality of hash values computed, a contiguous translation entry (TE) and a non-contiguous TE in different TLB banks of the plurality of TLB banks. The TLB logic determines a result by comparing the tag with the contiguous TE located and by comparing the tag with the non-contiguous TE located. The TLB logic outputs the result determined toward servicing the memory request. The TLB logic advantageously enables the TLB implementation to support contiguous pages using standard random-access memories for the plurality of TLB banks.

32 Claims, 5 Drawing Sheets

CIRCUIT AND METHOD FOR TRANSLATION LOOKASIDE BUFFER (TLB) IMPLEMENTATION

BACKGROUND

A translation lookaside buffer (TLB) is a memory cache that is used to reduce the time taken to access a memory location. The TLB is typically part of a chip's memory-management unit (MMU). The TLB stores the recent translations of virtual memory to physical memory and can be called an address-translation cache or, simply, a translation cache. It is typical for desktop, laptop, and server processors to include one or more translation lookaside buffers (TLBs) in memory-management hardware, and a TLB is nearly always present in any processor that utilizes paged or segmented virtual memory.

To translate (map) virtual memory addresses to physical memory addresses, page tables are used. Virtual memory would have a severe performance impact if it required a page table read on every load or store, doubling the delay of loads and stores. Fortunately, many consecutive loads or stores are likely to reference the same page. Therefore, if the processor remembers the last page table entry that it read, it can probably reuse the translation, that is, the virtual address to physical address translation, without rereading the page table. In general, the processor can keep the last several page table entries in the TLB. The processor "looks aside" to find the translation in the TLB to avoid having to find the translation via page table reads from physical memory, also referred to as a page "walk."

The translation (mapping) may be stored as a contiguous translation page table entry or non-contiguous page table entry, also referred to interchangeably herein as a contiguous translation entry and non-contiguous translation entry, respectively. The contiguous translation entry is a single entry that covers a contiguous range of multiple virtual page translations that are identical. The non-contiguous translation entry is a single entry covering a translation for a single virtual page. Regardless of the type of entry (contiguous vs. non-contiguous) that stores the translation, if the translation is found in the TLB, such a positive search may be referred to as a TLB "hit." If, however, the requested translation is not in the TLB, it is a "miss," and the processor may proceed by looking up the page table via the page walk. The page walk is time-consuming when compared to the processor speed, as it involves reading the contents of multiple memory locations and using them to compute the physical address. After the physical address is determined by the page walk, the virtual address to physical address mapping is entered into the TLB as a translation entry.

A TLB may be implemented via a standard random-access memory (RAM) or content-addressable memory (CAM). A standard RAM may be accessed via an index (address), whereas a CAM is accessed via content. As such, for a TLB that is implemented via a CAM, the CAM search key is the virtual address, and the search result is the physical address. If the requested address is present in the TLB, the CAM search yields a match quickly and the retrieved physical address can be used to access memory.

SUMMARY

According to an example embodiment, a circuit comprises a plurality of translation lookaside buffer (TLB) banks and TLB logic. The TLB logic is configured to compute a plurality of hash values of a tag included in a memory request. The TLB logic is further configured to locate, based on hash values of the plurality of hash values computed, a contiguous translation entry (TE) and a non-contiguous TE in different TLB banks of the plurality of TLB banks. The TLB logic is further configured to determine a result by comparing the tag with the contiguous TE located and by comparing the tag with the non-contiguous TE located. The TLB logic is further configured to output the result determined toward servicing the memory request.

The hash values of the plurality of hash values computed may be mathematically uncorrelated values.

The TLB logic may be further configured to produce the hash values of the plurality of hash values computed using respective hash functions. The respective hash functions may be mathematically uncorrelated.

The TLB logic may be further configured to locate the contiguous TE and locate the non-contiguous TE, concurrently.

A TLB bank of the plurality of TLB banks may be shared by contiguous and non-contiguous translation entries.

The memory request may be issued by a component to access virtual memory on a chip. The circuit may be located on the chip. The component may be located on the chip or external to the chip.

The tag may include a memory address, or the memory address and at least one identifier. For non-limiting examples, the at least one identifier may include a virtual machine identifier of a virtual machine associated with the memory request, process identifier of a process associated with the memory request, or a combination thereof.

The hash values of the plurality of hash values computed may include a first hash value computed and a second hash value computed. The first hash value computed may be associated with the contiguous TE. The second hash value computed may be associated with the non-contiguous TE. A total number of bits of the first hash value computed may be greater than a total number of bits of the second hash value computed.

The TLB logic may be further configured to compute a first hash value, of the hash values of the plurality of hash values computed, using a first hash function. The first hash value computed may include a first hash portion and a second hash portion. The TLB logic may be further configured to use the second hash portion as a contiguous TE index for locating the contiguous TE. The TLB logic may be further configured to compute the second hash value using a second hash function. The second hash function may be mathematically uncorrelated with the first hash function. The TLB logic may be further configured to use the second hash value computed as a non-contiguous TE index for locating the non-contiguous translation entry. At a TLB bank of the plurality of TLB banks, the TLB logic may be further configured to select, based on the first hash portion, an index from the contiguous TE index and non-contiguous TE index, and locate an entry, within the TLB bank, referenced by the index selected. The contiguous TE entry may correspond to the entry located in an event the index selected is the contiguous TE index. The non-contiguous TE entry may correspond to the entry located in an event the index selected is the non-contiguous TE index.

The TLB logic may include a plurality of multiplexers. A TLB bank of the plurality of TLB banks may be coupled to a respective multiplexer of the plurality of multiplexers. The TLB logic may be further configured to compute a first hash value, of the hash values of the plurality of hash values computed, using a first hash function. The first hash value computed may include a first hash portion and a second hash portion. The TLB logic may be further configured to compute a second hash value, of the hash values of the plurality of hash values computed, using a second hash function. The TLB logic may be further configured to select, via the respective multiplexer and based on the first hash portion, between a) using the second hash portion of the first hash value computed to locate the contiguous TE within the TLB bank and b) using the second hash value computed to locate the non-contiguous TE within the TLB bank.

In an event the tag matches the contiguous TE located, the TLB logic may be further configured to output the contiguous TE located and configure the result to represent a TLB hit. It should be understood that such a match is not limited to the tag, in its entirety, matching the contiguous TE located. For example, such a match may be determined based on a selected (non-arbitrary) portion of the tag matching the contiguous TE located. In an event the tag (or selected portion of the tag) matches the non-contiguous TE located, the TLB logic may be further configured to output the non-contiguous TE located and configure the result to represent the TLB hit. In an event the tag (or selected portion of the tag) does not match the contiguous TE located and does not match the non-contiguous TE located, the TLB logic may be further configured to configure the result to represent a TLB miss.

The tag may include a contiguous parameter setting. A hash value of the hash values of the plurality of hash values may include a first hash portion and second hash portion. The TLB logic may be further configured to use the second hash portion as an index for locating the contiguous TE. In an event the tag does not match the contiguous TE located and does not match the non-contiguous TE located, the TLB logic may be further configured to configure the result to represent a TLB miss and, based on the contiguous parameter setting and the first hash portion, a) block a write to insert an entry at the contiguous TE located and allow the write to insert the entry at the non-contiguous TE located or b) block the write to insert the entry at the non-contiguous TE located and allow the write to insert the entry at the contiguous TE located.

For non-limiting example, TLB banks of the plurality of TLB banks may be random-access memories (RAMs) of a size $2^n$, or a respective combination of RAMs which, in combination, are of the size $2^n$. The hash values of the plurality of hash values computed may include a first hash value computed and second hash value computed. The first hash value computed may be an (n+1)-bit value and the second hash value computed may be an n-bit value for non-limiting example.

The hash values of the plurality of hash values computed may include a first hash value computed and second hash value computed and the TLB logic may be further configured to locate the contiguous TE within a TLB bank of the plurality of TLB banks based on the first hash value computed. The TLB logic may be further configured to locate the non-contiguous TE within another TLB bank of the plurality of TLB banks based on the second hash value computed and at least a portion of the first hash value computed.

The TLB logic may be further configured to associate a hash function with the contiguous TE. The TLB logic may be further configured to compute a hash value, of the hash values of the plurality of hash values computed, using the hash function. The TLB logic may be further configured to utilize a TLB bank of the plurality of TLB banks to locate the contiguous TE based on a portion of the hash value computed. The TLB logic may be further configured to utilize another TLB bank of the plurality of TLB banks to locate the non-contiguous TE based on the portion of the hash value computed.

According to another example embodiment, a method comprises computing a plurality of hash values of a tag included in a memory request. The method further comprises locating, based on hash values of the plurality of hash values computed, a contiguous translation entry (TE) and a non-contiguous TE in different translation lookaside buffer (TLB) banks of a plurality of TLB banks. The method further comprises determining a result by comparing the tag with the contiguous TE located and by comparing the tag with the non-contiguous TE located. The method further comprises outputting the result determined toward servicing the memory request.

According to yet another example embodiment, an apparatus comprises means for computing a plurality of hash values of a tag included in a memory request. The apparatus further comprises means for locating, based on hash values of the plurality of hash values computed, a contiguous translation entry (TE) and a non-contiguous TE in different translation lookaside buffer (TLB) banks of a plurality of TLB banks. The apparatus further comprises means for determining a result by comparing the tag with the contiguous TE located and by comparing the tag with the non-contiguous TE located. The apparatus further comprises means for outputting the result determined toward servicing the memory request.

Further alternative apparatus embodiments parallel those described above in connection with the example circuit embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

It should be understood that a translation lookaside buffer (TLB) bank referred to herein may be a logical bank (memory) that may include a plurality of sub-banks (sub-memories).

Some processor architectures, such as an Arm® processor architecture for non-limiting example, support translation table entries with embedded contiguous "hint" bits. Such translation table entries provide virtual address to physical address mappings. The hint bits indicate that some number of aligned and contiguous translation table entries can be combined into a single, larger entry within a cache. The provision of contiguous bits potentially allows a design to save space within its translation cache, allowing the cache to hold translations for more memory. The usage of contiguous bits is straightforward when content-addressable memories (CAMs) are used to locate translation entries. Use of contiguous bits with standard random-access memories (RAMs) is, however, not straightforward due to different tagging requirements between contiguous translation entries and non-contiguous translation entries.

A straightforward approach for implementing a translation lookaside buffer (TLB) using standard RAMs is to 1) have a dedicated random-access memory (RAM) for contiguous translation entries and a dedicated RAM for non-contiguous translation entries, each of which is read independently. The problem with this approach is that a ratio of contiguous translation entries to non-contiguous translation entries can be hard to predict and can fluctuate, leading to inefficient use of one of the RAMs. Another approach is to 2) have a shared RAM for both contiguous translation entries and non-contiguous translation entries, read sequentially. Such an approach has bandwidth and latency issues.

Another approach is to 3) ignore the lowest bits of the tag so that contiguous translation entries and non-contiguous translation entries map to a same location. This can exhibit poor performance for non-contiguous translation entries because, due to spatial locality, those entries all want to be in the cache, but are competing for the same slot in the cache. Yet another approach is to 4) ignore the contiguous bits altogether and store all the individual entries in the cache. This approach, however, wastes space in the cache which could have been used for other entries.

An example embodiment of a TLB, also referred to interchangeably herein as a translation cache, is disclosed herein such that contiguous translation entries and non-contiguous translation entries may be read, simultaneously. An example embodiment overcomes the space inefficiency issue by switching, based on attributes of a lookup, which memory might hold the contiguous translation entry versus non-contiguous translation entry. Such an example embodiment statistically allocates half the contiguous translation entries to each memory, and half the non-contiguous translation entries to each memory. Further, the example embodiment avoids the bandwidth and latency issues of a shared RAM, while avoiding the storage inefficiency due to mismatched ratios of contiguous translation entries to non-contiguous translation entries in a dedicated RAM design. An example embodiment of a circuit that implements such a TLB is disclosed below with regard to FIG. 1.

Figure 1:
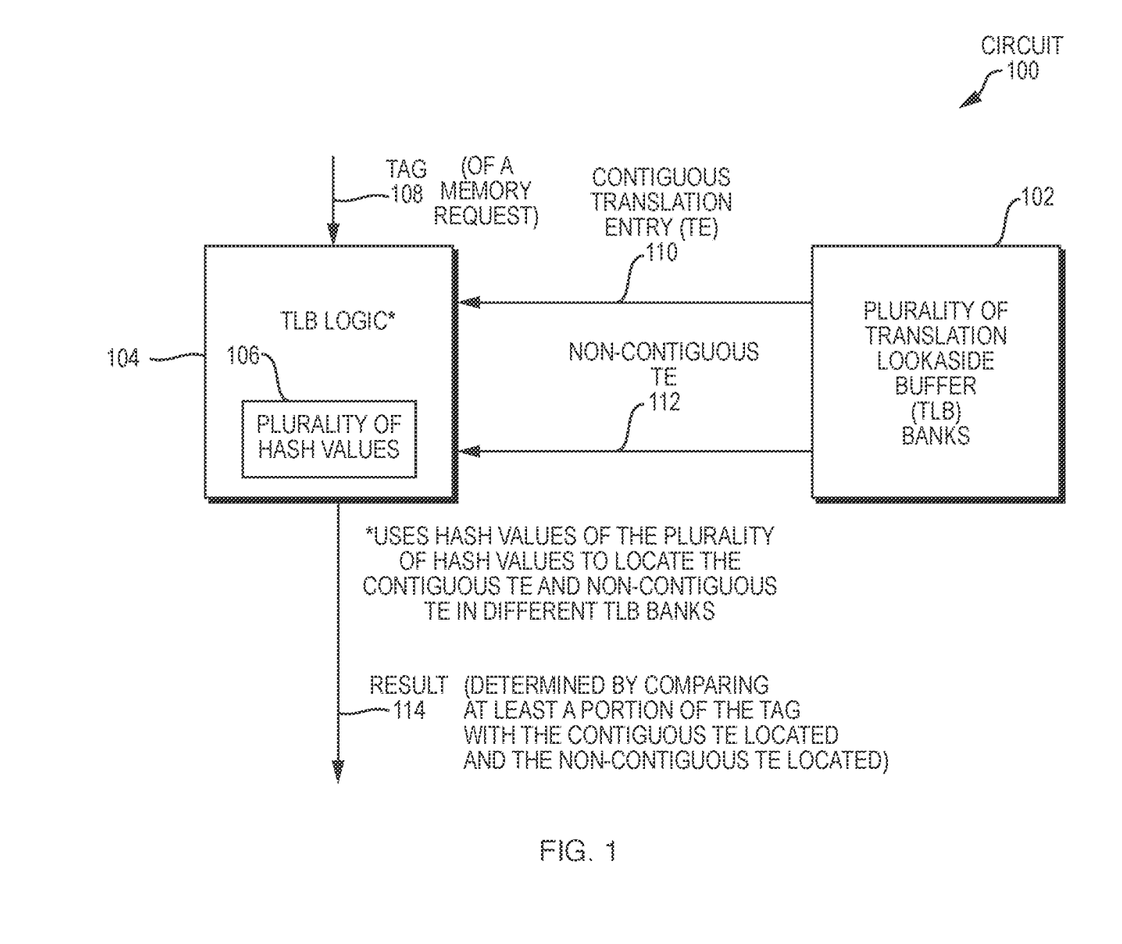
FIG. 1 is a block diagram of an example embodiment of a circuit for implementing a translation lookaside buffer (TLB).

FIG. 1 is a block diagram of an example embodiment of a circuit 100 for implementing a translation lookaside buffer (TLB). The circuit 100 comprises a plurality of TLB banks 102 and further comprises TLB logic 104. The TLB logic 104 is configured to compute a plurality of hash values 106 of a tag 108 included in a memory request (not shown). The TLB logic 104 is further configured to locate, based on hash values of the plurality of hash values 106 computed, a contiguous translation entry (TE) 110 and a non-contiguous TE 112 in different TLB banks (not shown) of the plurality of TLB banks 102. The TLB logic 104 is further configured to determine a result 114 by comparing at least a portion (not shown) of the tag 108 with the contiguous TE 110 located and by comparing the tag 108 with the non-contiguous TE 112 located. The TLB logic 104 is further configured to output the result 114 determined toward servicing the memory request.

In an event the tag 108 matches the contiguous TE 110 located, the TLB logic 104 may be further configured to output the contiguous TE 110 located and configure the result 114 to represent a TLB hit. Such TLB hit representation may be a value of 1 for non-limiting example, and may be any value used to represent a hit (match). In an event the tag 108 matches the non-contiguous TE 112 located, the TLB logic 104 may be further configured to output the non-contiguous TE 112 located and configure the result 114 to represent the TLB hit. If, however, the tag 108 does not match the contiguous TE 110 located and does not match the non-contiguous TE 112 located, the TLB logic may be further configured to configure the result 114 to represent a TLB miss. Such TLB miss representation may be a value of 0 for non-limiting example, and may be any value used to represent a miss (mismatch).

The tag 108 may include a contiguous parameter setting (not shown). A hash value (not shown) of the plurality of hash values 106 may include a first hash portion (not shown) and second hash portion (not shown). The TLB logic 108 may be further configured to use the second hash portion as an index (not shown) for locating the contiguous TE 110. In an event the tag 108 does not match the contiguous TE 110 located and does not match the non-contiguous TE 112 located, the TLB logic 104 may be further configured to configure the result 114 to represent the TLB miss and, based on the contiguous parameter setting and the first hash portion, a) block a write (not shown) to insert an entry (not shown) at a location at which the contiguous TE 110 is located and allow the write to insert the entry at a location at which the non-contiguous TE 112 is located or b) block the write to insert the entry at the location at which the non-contiguous TE 112 is located and allow the write to insert the entry at the location at which the contiguous TE 110 is located, as disclosed further below with regard to FIG. 3A.

Continuing with reference to FIG. 1, the memory request may be issued by a component (not shown) to access virtual memory (not shown) on a chip (not shown). The circuit 100 may be located on the chip. The component may be located on the chip or external to the chip. The tag 108 may include a memory address (not shown), or the memory address and at least one identifier (not shown). The at least one identifier may include a virtual machine identifier (not shown) of a virtual machine (not shown) that is associated with the memory request, process identifier (not shown) of a process (not shown) associated with the memory request, or a combination thereof, for non-limiting examples.

The plurality of TLB banks 102 may also be referred to interchangeably herein as a plurality of memories. According to an example embodiment, such TLB banks (memories) may each be shared memories that are each shared by contiguous and non-contiguous translation entries. Further, such TLB banks may be standard RAMs, namely memories that are accessed by an index (address), in contrast to content-addressable memories (CAMs), which are accessed by content.

The TLB logic 104 is further configured to use the hash values of the plurality of hash values 106 computed to locate the contiguous TE 110 and the non-contiguous TE 112 in different TLB banks of the plurality of TLB banks 102 and such entries, namely the contiguous TE 110 and non-contiguous TE 112, may be located by the TLB logic 104, concurrently (simultaneously). The hash values of the plurality of hash values 106 computed may be computed and employed to locate a contiguous TE and non-contiguous TE in different TLB banks on a memory-request-by-memory request basis. Thus, a TLB bank from the plurality of TLB banks 102 that is employed to locate the contiguous TE 110 responsive to a first memory request (not shown) may not be the same TLB bank employed to locate the contiguous TE 110 responsive to a second memory request (not shown). Similarly, a TLB bank from the plurality of TLB banks 102 that is employed to locate the non-contiguous TE 112 responsive to the first memory request may not be the same TLB bank employed to locate the non-contiguous TE 112 responsive to the second memory request The hash values of the plurality of hash values 102 computed and used to locate the contiguous TE 110 and the non-contiguous TE 112 may be mathematically uncorrelated values. As such, the hash values of the plurality of hash values 102 may appear random relative to one another, without any mathematical correlation therebetween. The TLB logic 104 may be further configured to produce the hash values of the plurality of hash values 106 computed using respective hash functions (not shown). The respective hash functions may be mathematically uncorrelated hash functions.

The hash values of the plurality of hash values 106 may include a first hash value (not shown) computed and a second hash value (not shown) computed. The TLB logic 104 may be further configured to locate the contiguous TE 110 within a TLB bank of the plurality of TLB banks 102 based on the first hash value computed. The TLB logic 104 may be further configured to locate the non-contiguous TE 112 within another TLB bank of the plurality of TLB banks 102 based on the second hash value computed and at least a portion (not shown) of the first hash value computed, as disclosed with regard to FIG. 2, further below.

Continuing with reference to FIG. 1, the TLB logic 104 may be further configured to associate a hash function (not shown) with the contiguous TE 110. The TLB logic 104 may be further configured to compute a hash value, of the hash values of the plurality of hash values 106 computed, using the hash function. The TLB logic 104 may be further configured to utilize a TLB bank of the plurality of TLB banks 102 to locate the contiguous TE 110 based on a portion of the hash value computed. The TLB logic 104 may be further configured to utilize another TLB bank of the plurality of TLB banks 102 to locate the non-contiguous TE 112 based on the portion of the hash value computed, as disclosed below with regard to FIG. 2.

Figure 2:
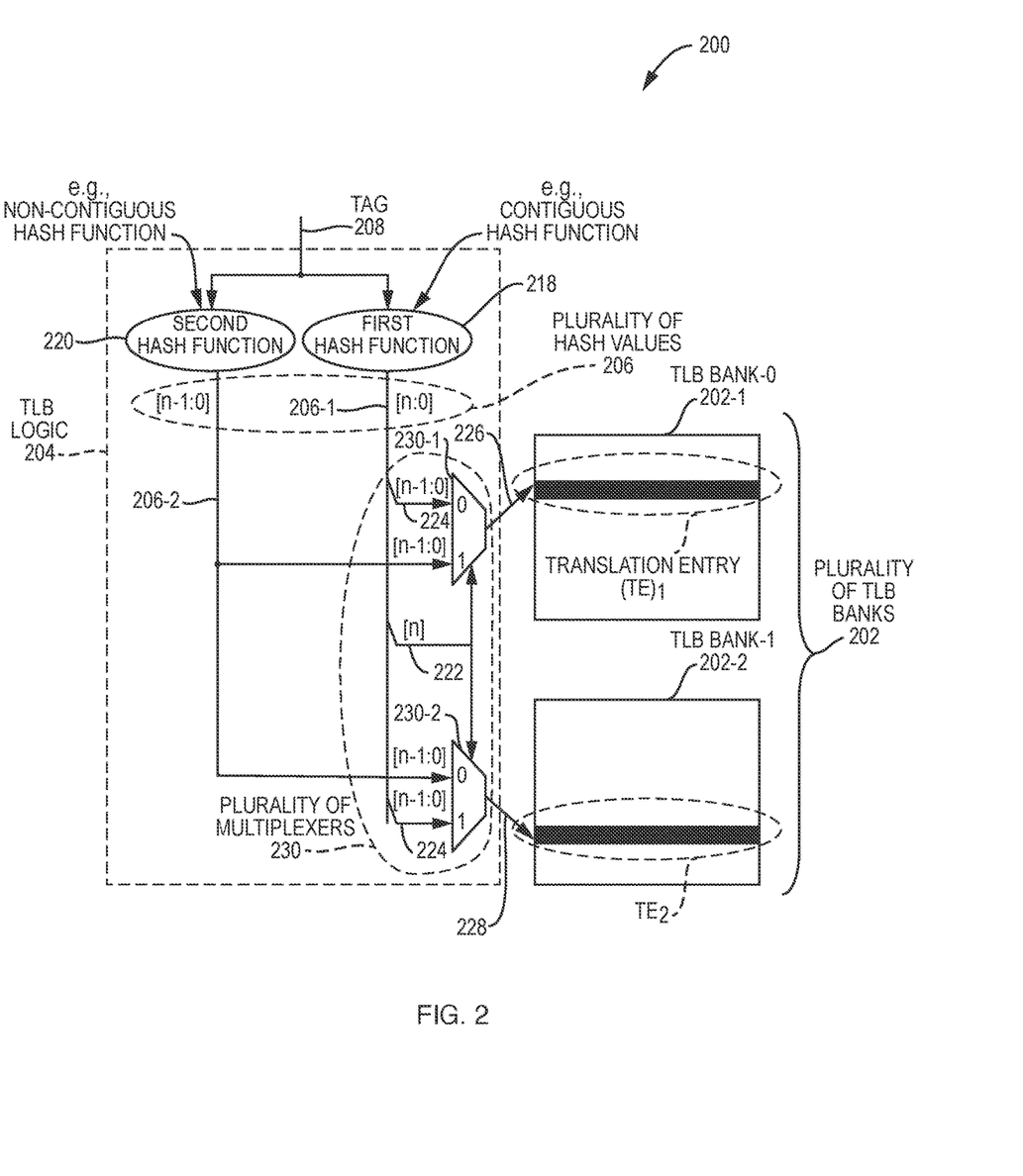
FIG. 2 is a schematic diagram of another example embodiment of a circuit for implementing a TLB.

FIG. 2 is a schematic diagram of another example embodiment of a circuit 200 for implementing a TLB. The circuit 200 may be employed as the circuit 100 of FIG. 1 for non-limiting example. The circuit 200 comprises a plurality of TLB banks 202, namely the TLB Bank-0 202-1 and the TLB Bank-1 202-2. The circuit 200 further comprises TLB logic 204. The TLB logic 204 is coupled to the plurality of TLB banks 202. It should be understood that the TLB logic 204 is not limited to the elements shown in FIG. 2.

The TLB logic 204 is configured to compute a plurality of hash values 206 of a tag 208. The tag 208 is included in a memory request (not shown). The TLB logic 204 is further configured to use hash values of the plurality of hash values 206 computed to locate a contiguous TE (not shown) and a non-contiguous TE (not shown) in different TLB banks of the plurality of TLB banks 202. The contiguous TE located and non-contiguous TE located may be the translation entry $(TE)_1$ and $TE_2$, respectively, or vice versus.

In the example embodiment of FIG. 2, the plurality of hash values 206 computed include a first hash value 206-1 computed and a second hash value 206-2 computed. The first hash value 206-1 computed may be associated with the contiguous TE. The second hash value 206-2 computed may be associated with the non-contiguous TE. The first hash value 206-1 computed may have more bits (e.g., [n:0]) relative to a total number of bits (e.g., [n−1:0]) of the second hash value 206-2 computed. As such, a total number of bits of the first hash value 206-1 computed may be greater than a total number of bits of the second hash value 206-2 computed. For non-limiting example, the TLB banks of the plurality of TLB banks 202 may be random-access memories (RAMs) of a size $2^n$, or a respective combination of RAMs which, in combination, are of the size $2^n$. The first hash value 206-1 computed may be an (n+1)-bit value and the second hash value computed 206-2 may be an n-bit value for non-limiting example.

It should be understood that the first hash value 206-1 computed is not limited to being one greater than the total number of bits of the second hash value 206-2 computed. For example, while a single bit (e.g., [n]) of the first hash value 206-1 may be used to select an index to reference a TLB bank in the non-limiting example of FIG. 2, multiple bits from the first hash value 206-1 computed may be employed to select same. As such the first hash value 206-1 and second hash value 206-2 would be smaller hash values relative to the case in which the single bit is employed for selection. Such an alternative design (multiple bits for selection) would result in the first hash value 206-1 and second hash value 206-2 having a portion in common (shared) and thus, such hash values would not be mathematically uncorrelated, degrading performance due to lesser diversity (balance) of contiguous and non-contiguous translation entries among the TLB banks of the plurality of TLB banks 202.

Continuing with reference to FIG. 2, the TLB logic 204 may be further configured to compute the first hash value 206-1, of the hash values of the plurality of hash values 206 computed, using a first hash function 218. The first hash function 218 may be referred to interchangeably herein as a contiguous hash function as at least a portion of the hash value generated by same, namely at least a portion of the first hash value 206-1, may be employed as an index for locating the contiguous TE within a TLB bank of the plurality of TLB banks 202. Such index may be referred to herein as a contiguous TE index. The first hash value 206-1 computed may include a first hash portion 222 (e.g., [n] of the first hash value 206-1) and a second hash portion 224 (e.g., [n−1:0] of the first hash value 206-1), wherein the first hash portion 222 and second hash 224 are different portions and n is a total number of bits of the first hash value 206-1.

The TLB logic 204 may be further configured to use the second hash portion 224 as an index (address) to locate the contiguous TE, such as by using the second hash portion 224 as a memory address 226 of $TE_1$ of the TLB Bank-0 202-1 or as a memory address 228 of a translation entry $TE_2$ of the TLB Bank-1 202-2.

The TLB logic 204 may be further configured to compute the second hash value 206-2, of the hash values of the plurality of hash values 206 computed, using a second hash function 220. The second hash function 220 may be referred to interchangeably herein as a non-contiguous hash function as the hash value generated by same, namely the second hash value 206-2, may be employed as an index to reference the non-contiguous TE within a TLB bank of the plurality of TLB banks 202.

The second hash function 220 may be mathematically uncorrelated with the first hash function 218. The TLB logic 204 may be further configured to use the second hash value 206-2 computed as an index for locating the non-contiguous TE, such as by using the second hash value 206-2 as a memory address 226 of $TE_1$ of the TLB Bank-0 202-1 or as the memory address 228 of $TE_2$ of the TLB Bank-1 202-2. Such index may be referred to interchangeably herein as a non-contiguous TE index. The bank that is used to locate the non-contiguous TE, that is the TLB Bank-0 202-1 or the TLB Bank-1 202-2, is separate (different) from the TLB bank used to locate the contiguous TE, on a memory-request-by-memory request basis. The first hash portion 222 is used to determine which TLB banks are used for locating such entries, on the memory-request-by-memory request basis, as disclosed further below.

As such, the TLB logic 204 may be further configured to use the second hash portion 224 (e.g., [n−1:0]) of the first hash value 206-1 as a contiguous TE index for locating the contiguous TE. The TLB logic 204 may be further configured to use the second hash value 206-2 computed as a non-contiguous TE index for locating the non-contiguous TE. The second hash portion 224 and second hash value 206-1 may be of the same length, that is, respective values of same may have the same total number of bits. At a TLB bank of the plurality of TLB banks, the TLB logic 204 may be further configured to select, based on the first hash portion 222, an index from the contiguous TE index (i.e., the second hash portion 224) and non-contiguous TE index (i.e., the second hash value 206-2), and locate an entry, within the TLB bank, referenced by the index selected. The contiguous TE entry located may correspond to the entry located in an event the index selected is the contiguous TE index. The non-contiguous TE entry located may correspond to the entry located in an event the index selected is the non-contiguous TE index.

As such, the TLB logic 204 may be further configured to, at a TLB bank of the plurality of TLB banks, determine, based on the first hash portion 222, whether to reference a memory location of the TLB bank a) using the second hash portion 224 of the first hash value 206-1 computed to locate the contiguous TE or b) using the second hash value 206-2 computed to locate the non-contiguous TE. For example, at the TLB Bank-0 202-1, the TLB logic 204 may determine, based on the first hash portion 222, whether to use the second hash portion 224 of the first hash value 206-1 computed as an index for locating the contiguous TE within the TLB Bank-0 202-1, or to use the second hash value 206-2 computed as an index for locating the non-contiguous TE within the TLB Bank-0 202-1.

For non-limiting example, the TLB logic 204 may include a plurality of multiplexers 230. Each TLB bank (e.g., TLB Bank-1 202-1 and TLB Bank-1 202-2) of the plurality of TLB banks 202 may be coupled to a respective multiplexer of the plurality of multiplexers. For example, the TLB Bank-0 202-1 is coupled to the multiplexer 230-1 and the TLB Bank-1 202-2 is coupled to the multiplexer 230-2 in the non-limiting example embodiment. The TLB logic 204 may be further configured to select, via the respective multiplexer and based on the first hash portion 222, between a) using the second hash portion 224 of the first hash value 206-1 computed to locate the contiguous TE within the TLB bank and b) using the second hash value 206-2 computed to locate the non-contiguous TE within the TLB bank.

For simplicity and non-limiting example, the circuit 200 may be considered a design (structure) for a direct mapped translation cache. A total number of bits in the tag 208 (excluding the contiguous bit) may be m. A contiguous TE would encompass $2^c$ normal entries, and would ignore the lowest c bits of the tag 208, where m>n>c. In the design, two identical RAMs each of size $2^n$ may be employed, such as the TLB Bank-1 202-1 and TLB Bank-1 202-2, or a respective equivalent combination of smaller RAMs.

Figure 3A:
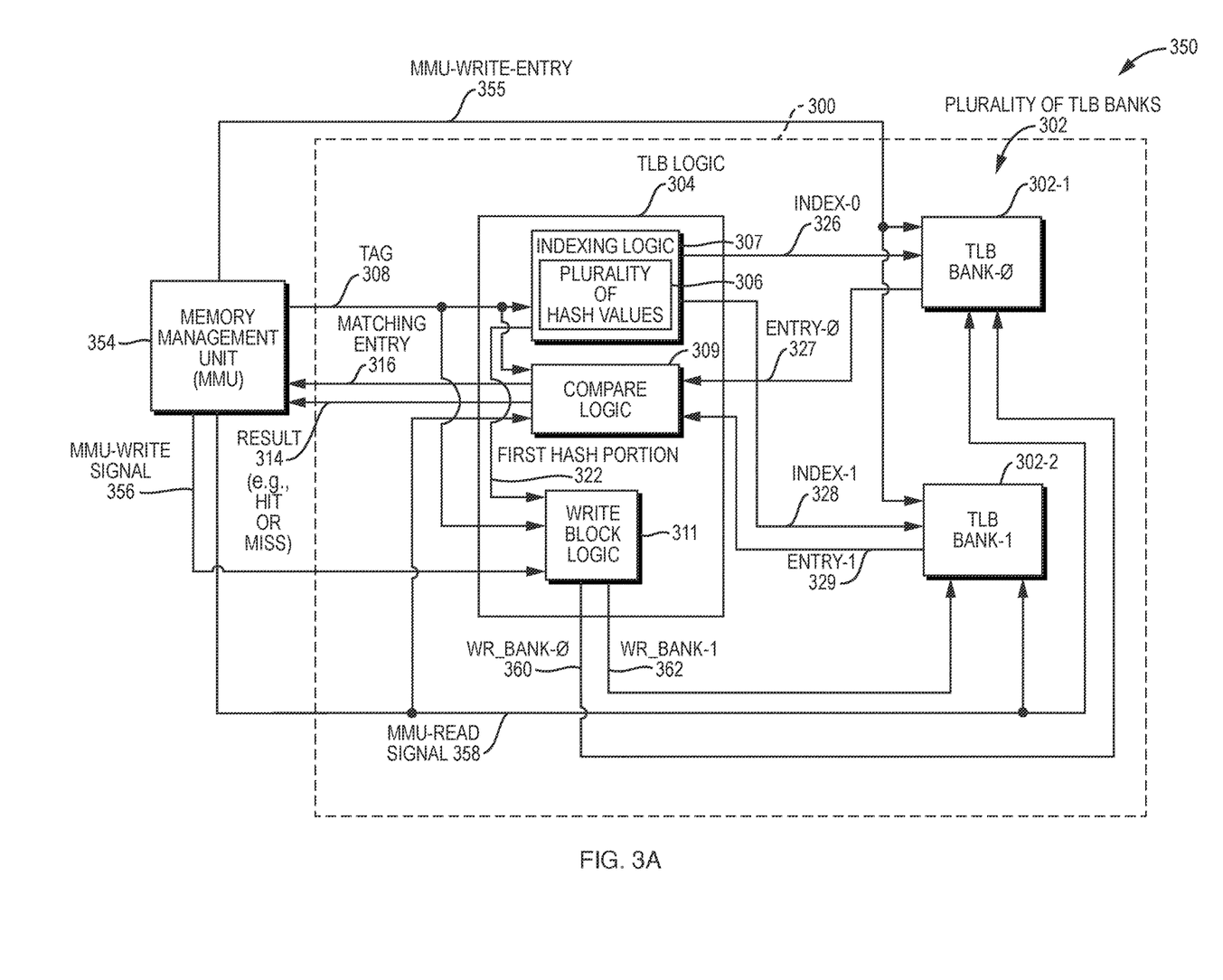
FIG. 3A is a block diagram of an example embodiment of a system that may employ a TLB implemented via an example embodiment disclosed herein.

The TLB logic 204 may employ the first hash function 218 to construct (compute) any well-formed hash taking as input m-c bits of the tag 208 and producing as output n+1 bits composing the first hash value 206-1 computed. These output bits, namely the first hash value 206-1, determine where to locate a contiguous TE within the two RAMs, namely TLB Bank-0 202-1 and TLB Bank-1 202-2. Further to locating same, the TLB logic 204 may compare the contiguous TE located with the tag 208 to determine whether there is a TLB hit/miss, as disclosed above. Responsive to the TLB miss, the circuit 200 may insert (place, store) an entry at a location at which the contiguous TE is located, in an event the circuit 200 is writing a contiguous TE, as disclosed further below with regard to FIG. 3.

Continuing with reference to FIG. 2, the second hash function 220 may be used to construct (compute) any well-formed hash taking as input m bits of the tag 208 and producing as output n bits. These output bits compose the second hash value 206-2 and determine where to locate a non-contiguous TE within the RAM that is not used (selected) to locate the contiguous TE. Further to locating same, the TLB logic 204 may compare the non-contiguous TE located with the tag 208 to determine whether there is a TLB hit/miss, as disclosed above. Responsive to the TLB miss, the circuit 200 may insert (place, store) an entry at a location at which the non-contiguous TE is located, in an event the circuit 200 is writing a non-contiguous TE, as disclosed further below with regard to FIG. 3.

Continuing further with reference to FIG. 2, for performance, it is useful for the two hashes, namely the first hash value 206-1 and second hash value 206-2, to be independent, that is, there should be no mathematical correlation between the two locations referenced via same, besides being in opposite (different) RAMs.

In the example embodiment of the circuit 202, the contiguous bit does not need to be stored/checked as part of the cached translation entry as any located entry that matches the upper m-c bits of the tag 208 is going to be of the correct type. The design is easily extended to set-associative caches by multiplying the number of RAMs by the associativity and reading all the corresponding entries out in parallel. This design is also easily extended to skewed set-associative caches by creating an n bit hash for each additional memory. In such a design, it is also useful for all of the hashes to be independent, that is, mathematically uncorrelated.

FIG. 3A is a block diagram of an example embodiment of a system 350 that may employ a translation lookaside buffer (TLB) implemented via an example embodiment disclosed herein. The system 350 may be a system-on-a-chip (SoC) for non-limiting example. The system 350 comprises a memory management unit (MMU) 354 and a circuit 300. The circuit 300 may be employed as the circuit 100 or circuit 200, disclosed above with regard to FIG. 1 and FIG. 2, respectively. Continuing with reference to FIG. 3A, the circuit 300 may be referred to as a TLB. The memory management unit 354 is coupled to the TLB, that is, the circuit 300.

The circuit 300 may be referred to interchangeably herein as a translation cache or TLB as the circuit 300 functions as a cache of recently accessed page translations of the MMU 354. According to a non-limiting example embodiment, the circuit 300 may be included in the MMU 354. For each memory access (not shown) performed by a requester (not shown), the MMU 354 may check whether a requested address translation for a virtual address (not shown) of such memory access issued by the requester is cached in the TLB, that is, cached in the circuit 300. If the requested address translation causes a "hit" (match) within the TLB, the translation of the virtual address is immediately available.

If the circuit 300 (TLB) does not contain a translation entry for the virtual address, such scenario may be referred to as a TLB "miss" (mismatch), and an external translation table walk or lookup may be performed by the MMU 354. Dedicated hardware (not shown) within the MMU 354 may, in turn, enable the MMU 354 to read the translation tables (not shown) in memory (not shown) via a translation table walk (traversal) as is known in the art. The newly loaded translation can then be cached in the circuit 300 for possible reuse, by writing such translation as the MMU-write-entry 355, as disclosed further below.

The circuit 300 may hold a fixed number of translation entries via the plurality of TLB banks 302. The circuit 300 may provide a result 314 to the MMU 354 indicating whether a requested address translation is a hit or miss. In an event the requested address translation is a hit, the circuit 300 may provide a matching entry 316 that may be a contiguous translation entry (TE) (not shown) or non-contiguous TE (not shown). Alternatively, the circuit may simply provide the physical address included in same. A higher hit rate improves performance by reducing a number of external memory accesses otherwise caused by translation table traversal. Contiguous block entries, namely contiguous translation entries, may be used to efficiently use TLB space. A contiguous TE may be a single entry covering translations for multiple blocks, which may be cached by the circuit 300 for a defined range of addresses, making it possible to store a larger range of virtual address to physical address translations within the circuit 300, that is, the TLB, than is otherwise possible.

Regardless of whether a TE is contiguous or non-contiguous, such TE may not only include physical and virtual addresses, but other attributes as well, such as attributes indicating memory type, cache policy, access permission, address space ID (ASID), and/or a virtual machine ID (VMID) for non-limiting examples.

In the example embodiment, the circuit 300 further includes a plurality of TLB banks 302 and TLB logic 304. The plurality of TLB banks 302 includes a first TLB bank (i.e., TLB Bank-0 302-1) and a second TLB bank (TLB Bank-1 302-2) for non-limiting example. The TLB logic 304 is coupled to the plurality of TLB banks 302. The TLB logic 304 is configured to compute a plurality of hash values 306 of a tag 308. The tag 308 is included in a memory request and may be received by the TLB logic 304 from the MMU 354 in response to the memory request being issued by a requester, as disclosed below with reference to FIG. 3B.

Figure 3B:
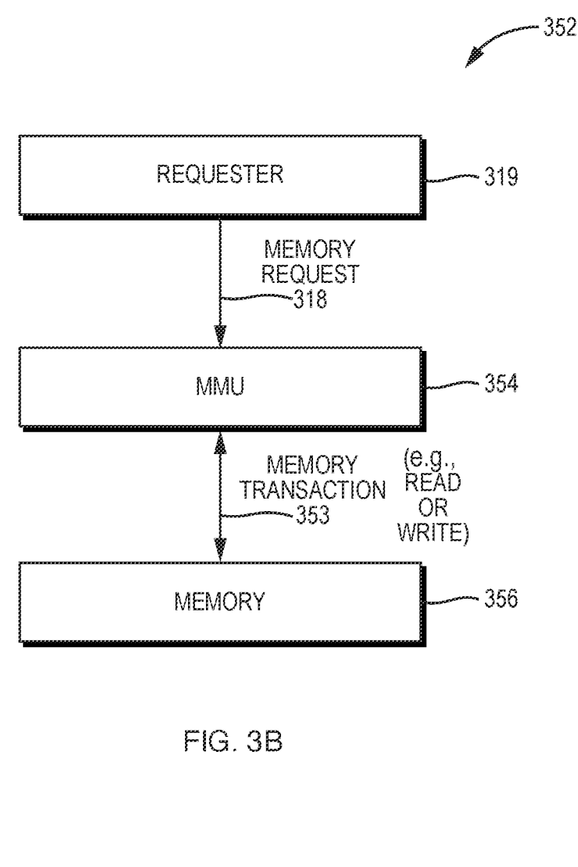
FIG. 3B is a block diagram of an example embodiment of a system in which a memory request is issued.

FIG. 3B is a block diagram of an example embodiment of a system 352 in which a memory request 318 is issued. With reference to FIG. 3A and FIG. 3B, the system 352 comprises a requester 319, the MMU 354, and memory 356. The memory request 318 may be issued by the requester 319 to access a virtual memory address (not shown) that maps to a physical memory address within the memory 356. The system 350 may be located on the chip. The requester 319 and memory 356 may be located on the chip or external to the chip. The MMU 354 may check whether a requested address translation for the virtual address is cached in the circuit 300. If the requested address translation causes a "hit" (match) within the TLB, the translation of the virtual address is immediately available to the MMU 354, as provided via the matching entry 316, and the MMU 354 may employ same to perform a memory transaction 353 to the memory 356 based on the memory request 318. Alternatively, if the translation is not available in the circuit 300, the MMU 354 may perform a translation table walk or lookup in page translation tables (not shown) via a page translation table walk (traversal) as is known in the art. The newly loaded translation can then be cached in the circuit 300 for possible reuse, by writing such translation as an MMU-write-entry 355, and used by the MMU 354 to perform the memory transaction 353 or to provide such translation (not shown) to the requester 319.

The translation table walk and subsequent write of the MMU-write-entry 355 are, however, avoided if the circuit 300 responds with the matching entry 316 and the result 314 representing a TLB miss. The result 314 may be determined by the TLB logic 304 as disclosed below.

As disclosed above, the TLB logic 304 is configured to compute the plurality of hash values 306 of the tag 308. The tag 308 is included in the memory request 318 and may be received by the TLB logic 304 from the MMU 354 in response to the memory request 318 being issued by the requester 319. The MMU 354 may assert a MMU-read-signal 358 that may cause the TLB logic 304 to compare the tag 308 with a contiguous TE (not shown) and non-contiguous TE (not shown) located by the TLB logic 304 in different TLB banks, such as the TLB Bank-0 302-1 and TLB Bank-1 302-2, of the plurality of TLB banks 302. The TLB logic 304 may include indexing logic 307 to produce an index-0 326 and index-1 328 to the TLB Bank-0 302-1 and TLB Bank-1 302-2, respectively. The TLB logic 304 may further include compare logic 309 that may be configured to compare an entry-0 327 and entry-1 329, located at the index-0 326 and index-1 328, respectively, with the tag 308. Such comparison may be performed by the compare logic 309 in response to an assertion of the MMU-read signal 358 which may be asserted by the MMU 354 responsive to receipt of the memory request 318.

The entry-0 327 and entry-1 329 may represent a contiguous TE located and a non-contiguous TE located, respectively, or vice-versus, based on the index-0 326 and index-1 328, which may be a contiguous TE index or non-contiguous TE index, as disclosed above with reference to FIG. 2. With reference to FIG. 2 and FIG. 3A, the TLB logic 204 may be employed as the indexing logic 307 of the TLB logic 304, wherein the memory address 226 may be employed as the index-0 326 and the memory address 228 may be employed as the memory address 228.

The TLB logic 304 may locate, based on hash values of the plurality of hash values 306 computed, a contiguous translation TE and a non-contiguous TE in different TLB banks, namely the TLB Bank-0 302-1 and TLB Bank-1 302-2, of the plurality of TLB banks 302. The TLB logic 304 includes the compare logic 309 that may be configured to determine the result 314 by comparing the tag 308 with the contiguous TE located and by comparing the tag 308 with the non-contiguous TE located. The compare logic 309 may be further configured to output the result 314 determined toward servicing the memory request, such as the memory request 318 of FIG. 3B.

Continuing with reference to FIG. 3A, in an event the tag 308 matches the contiguous TE located, the compare logic 309 may be further configured to output the contiguous TE located as the matching entry 316 and may configure the result 314 to represent a TLB hit. In an event the tag 308 matches the non-contiguous TE located, the compare logic 309 may be further configured to output the non-contiguous TE located as the matching entry 316 and may configure the result 314 to represent the TLB hit. If, however, the tag 308 does not match the contiguous TE located and does not match the non-contiguous TE located, the compare logic 309 may be further configured to configure the result 314 to represent a TLB miss.

The tag 308 may include a contiguous parameter setting (not shown). A hash value (not shown) of the plurality of hash values 306 may include a first hash portion 322 and second hash portion (not shown). The indexing logic 307 may be further configured to use the second hash portion as an index (index-0 326 or index-1 328) for locating the contiguous TE. The first hash portion 322 may be the first hash portion 222 of FIG. 2, disclosed above.

Continuing with reference to FIG. 3A, in an event the tag 308 does not match the contiguous TE located (entry-0 327 or entry-1 329) and the non-contiguous TE (entry-0 327 or entry-1 329) located, the compare logic 309 may be further configured to configure the result 314 to represent the TLB miss. Further to receipt of such TLB miss, the MMU 354 may perform a translation table walk, as disclosed above, and insert a translation entry retrieved via same into the TLB, that is, the circuit 300, by writing such translation entry as the MMU-write-entry 355 and asserting the MMU-write-signal 356. It should be understood that while the MMU-write-signal 356 and MMU-read-signal 355 may be shown and described as separate signals, such signals may be a single signal with different levels or clock edge transitions associated with same to signify a read vs. write.

Such entry being written, that is, the MMU-write-entry 355, is a contiguous TE or non-contiguous TE type of TE, as specified by the contiguous parameter of the tag 308. The TLB logic 304 may further comprise write block logic 311 that may be configured to ensure that such entry is only written to one of the TLB banks of the plurality of TLB banks 302 used for locating the contiguous TE or non-contiguous TE, as appropriate. To perform same, the write block logic 311 may be configured to use the contiguous parameter setting of the tag 308 and the first hash portion 322. Based on the contiguous parameter setting of the tag 308 and the first hash portion 322, the write block logic 311 may be configured to a) block the MMU-write-signal 356 from causing the MMU-write-entry 355 from being inserted at a location (index-0 326 or index-1 328) at which the contiguous TE is located and allow the MMU-write-signal 356 to cause the MMU-write-entry 355 to be inserted at a location at which the non-contiguous TE is located or b) block the MMU-write-signal 356 from causing the MMU-write-entry 355 from being inserted at the location (index-0 326 or index-1 328) at which the non-contiguous TE is located and allow the MMU-write-signal 356 to cause the MMU-write-entry 355 to be inserted at the location at which the contiguous TE is located.

In order to block or allow the MMU-write-signal 356, the write block logic 311 may be further configured to receive the MMU-write signal 356 and generate a write-bank-0 signal 360 and write-bank-1 signal 362 to the TLB Bank-0 302-1 and TLB Bank-1 302-2, respectively, representing a blocked version of the MMU-write-signal 356 or the MMU-write-signal 356 itself, as appropriate.

Figure 4:
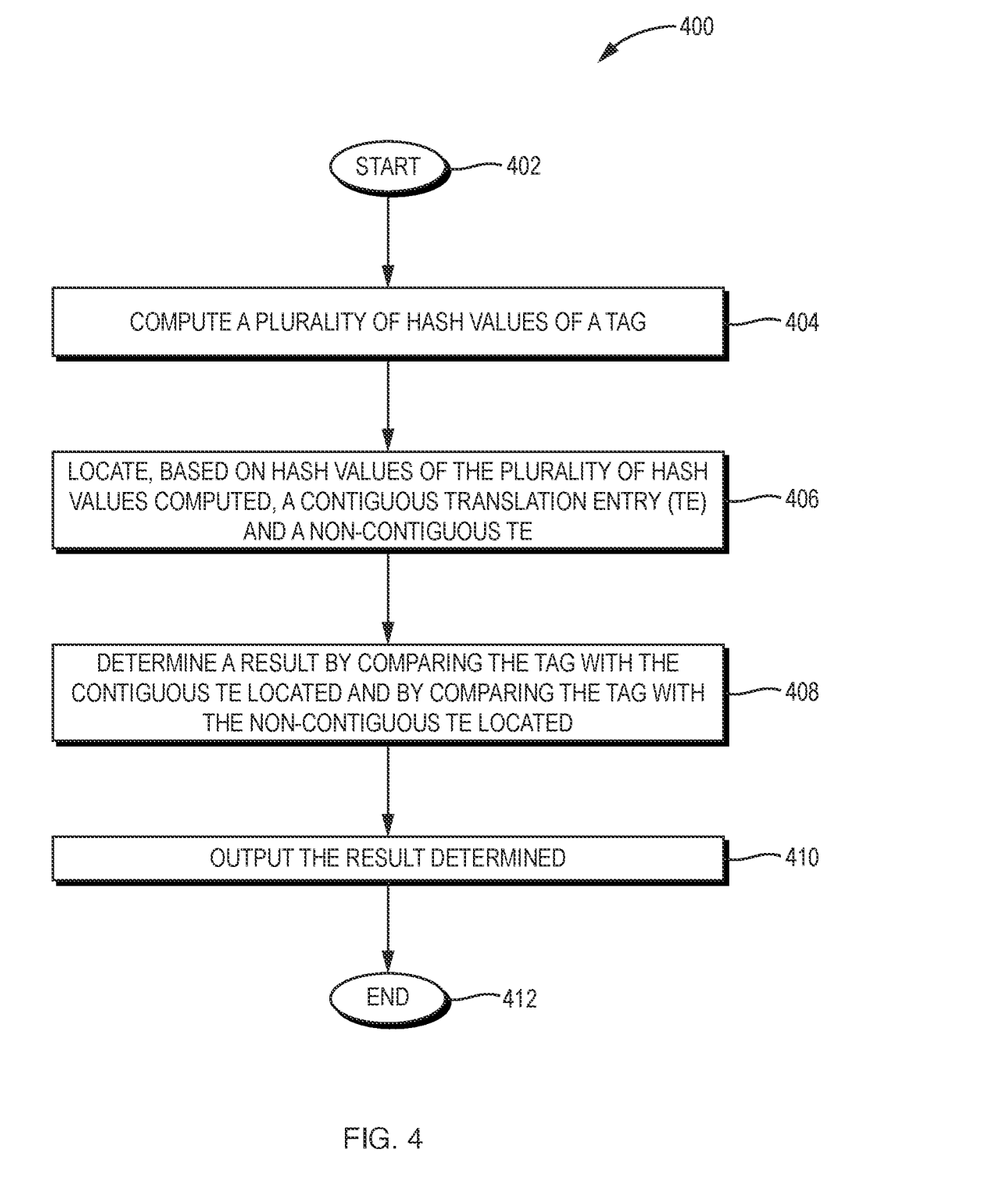
FIG. 4 is a flow diagram of an example embodiment of a method for TLB implementation.

FIG. 4 is a flow diagram of an example embodiment of a method (400) for translation lookaside buffer (TLB) implementation. The method begins (402) and comprises computing a plurality of hash values of a tag included in a memory request (404). The method further comprises locating, based on hash values of the plurality of hash values computed, a contiguous translation entry (TE) and a non-contiguous TE in different translation lookaside buffer (TLB) banks of a plurality of TLB banks (406). The method further comprises determining a result by comparing the tag with the contiguous TE located and by comparing the tag with the non-contiguous TE located (408). The method further comprises outputting the result determined toward servicing the memory request (410). The method thereafter ends (412) in the example embodiment.

The method may further comprise producing the hash values of the plurality of hash values computed using respective hash functions. The respective hash functions may be mathematically uncorrelated.

The method may further comprise locating the contiguous TE and locating the non-contiguous TE, concurrently. The method may further comprise sharing a TLB bank of the plurality of TLB banks by contiguous and non-contiguous translation entries. While different TLB banks may be used to locate a contiguous TE and non-contiguous TE on a memory-request-by-memory-request basis, either of such TLB banks may store both types of entries, that is, translation entries of type contiguous and translation entries of type non-contiguous. A TLB bank of the plurality of TLB banks is not dedicated to store a specific type of TE.

The method may further comprise computing a first hash value, of the hash values of the plurality of hash values computed, using a first hash function. The first hash value computed may include a first hash portion and a second hash portion. The method may further comprise using the second hash portion as a contiguous TE index for locating the contiguous TE. The method may further comprise computing the second hash value using a second hash function. The second hash function may be mathematically uncorrelated with the first hash function. The method may further comprise using the second hash value computed as a non-contiguous TE index for locating the non-contiguous translation entry.

The method may further comprise, at a TLB bank of the plurality of TLB banks, selecting, based on the first hash portion, an index from the contiguous TE index and non-contiguous TE index, and locating an entry, within the TLB bank, referenced by the index selected. The contiguous TE entry may correspond to the entry located, in an event the index selected is the contiguous TE index. The non-contiguous TE entry may correspond to the entry located, in an event the index selected is the non-contiguous TE index.

The method may further comprise selecting, based on the first hash portion, between a) using the second hash portion of the first hash value computed to locate the contiguous TE within a TLB bank of the plurality of TLB banks and b) using the second hash value computed to locate the non-contiguous TE within the TLB bank.

In an event the tag matches the contiguous TE located, the method may further comprise outputting the contiguous TE located and configuring the result to represent a TLB hit. In an event the tag matches the non-contiguous TE located, the method may further comprise outputting the non-contiguous TE located and configuring the result to represent the TLB hit. In an event the tag does not match the contiguous TE located and does not match the non-contiguous TE located, the method may further comprise configuring the result to represent a TLB miss.

The tag may include a contiguous parameter setting. A hash value of the hash values of the plurality of hash values computed may include a first hash portion and second hash portion. The method may further comprise using the second hash portion as an index for locating the contiguous TE. In an event the tag does not match the contiguous TE located and does not match the non-contiguous TE located, the method may further comprise configuring the result to represent a TLB miss and, based on the contiguous parameter setting and the first hash portion, the method may further comprise a) blocking a write to insert an entry at the contiguous TE located and allowing the write to insert the entry at the non-contiguous TE located or b) blocking the write to insert the entry at the non-contiguous TE located and allowing the write to insert the entry at the contiguous TE located.

Hash values of the plurality of hash values computed may include a first hash value computed and a second hash value computed and the method may further comprise locating the contiguous TE within a TLB bank of the plurality of TLB banks based on the first hash value computed. The method may further comprise locating the non-contiguous TE within another TLB bank of the plurality of TLB banks based on the second hash value computed and at least a portion of the first hash value computed.

The method may further comprise associating a hash function with the contiguous TE. The method may further comprise computing a hash value, of the hash values of the plurality of hash values computed, using the hash function. The method may further comprise utilizing a TLB bank of the plurality of TLB banks to locate the contiguous TE based on a portion of the hash value computed. The method may further comprise utilizing another TLB bank of the plurality of TLB banks to locate the non-contiguous TE based on the portion of the hash value computed.

The elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:
1. A circuit comprising:
a plurality of translation lookaside buffer (TLB) banks; and
TLB logic configured to (i) compute a plurality of hash values of a tag included in a memory request, (ii) locate, based on hash values of the plurality of hash values computed, a contiguous translation entry (TE) and a non-contiguous TE in different TLB banks of the plurality of TLB banks, (iii) determine a result by comparing the tag with the contiguous TE located and by comparing the tag with the non-contiguous TE located, and
(iv) output the result determined toward servicing the memory request.

2. The circuit of claim 1, wherein the hash values of the plurality of hash values computed are mathematically uncorrelated values.

3. The circuit of claim 1, wherein the TLB logic is further configured to produce the hash values of the plurality of hash values computed using respective hash functions and wherein the respective hash functions are mathematically uncorrelated.

4. The circuit of claim 1, wherein the TLB logic is further configured to locate the contiguous TE and locate the non-contiguous TE, concurrently.

5. The circuit of claim 1, wherein the different TLB banks are shared by contiguous and non-contiguous translation entries.

6. The circuit of claim 1, wherein the memory request is issued by a component to access virtual memory on a chip, wherein the circuit is located on the chip, and wherein the component is located on the chip or external to the chip.

7. The circuit of claim 1, wherein the tag includes a memory address or the memory address and at least one identifier.

8. The circuit of claim 7, wherein the at least one identifier includes a virtual machine identifier of a virtual machine associated with the memory request, process identifier of a process associated with the memory request, or a combination thereof.

9. The circuit of claim 1, wherein the hash values of the plurality of hash values computed include a first hash value computed and a second hash value computed, wherein the first hash value computed is associated with the contiguous TE, wherein the second hash value computed is associated with the non-contiguous TE, and wherein a total number of bits of the first hash value computed is greater than a total number of bits of the second hash value computed.

10. The circuit of claim 1, wherein the TLB logic is further configured to:
compute a first hash value, of the hash values of the plurality of hash values computed, using a first hash function, the first hash value computed including a first hash portion and a second hash portion;
use the second hash portion as a contiguous TE index for locating the contiguous TE;
compute a second hash value, of the hash values of the plurality of hash values computed, using a second hash function, the second hash function mathematically uncorrelated with the first hash function;
use the second hash value computed as a non-contiguous TE index for locating the non-contiguous translation entry; and
at a TLB bank of the plurality of TLB banks, select, based on the first hash portion, an index from the contiguous TE index and non-contiguous TE index, and locate an entry, within the TLB bank, referenced by the index selected, the contiguous TE entry located corresponding to the entry located in an event the index selected is the contiguous TE index, the non-contiguous TE entry located corresponding to the entry located in an event the index selected is the non-contiguous TE index.

11. The circuit of claim 1, wherein the TLB logic includes a plurality of multiplexers, wherein a TLB bank of the plurality of TLB banks is coupled to a respective multiplexer of the plurality of multiplexers, and wherein the TLB logic is further configured to:

compute a first hash value, of the hash values of the plurality of hash values computed, using a first hash function, the first hash value computed including a first hash portion and a second hash portion;

compute a second hash value, of the hash values of the plurality of hash values computed, using a second hash function; and select, via the respective multiplexer and based on the first hash portion, between a) using the second hash portion of the first hash value computed to locate the contiguous TE within the TLB bank and b) using the second hash value computed to locate the non-contiguous TE within the TLB bank.

12. The circuit of claim 1, wherein:

in an event the tag matches the contiguous TE located, the TLB logic is further configured to output the contiguous TE located and configure the result to represent a TLB hit;

in an event the tag matches the non-contiguous TE located, the TLB logic is further configured to output the non-contiguous TE located and configure the result to represent the TLB hit; and in an event the tag does not match the contiguous TE located and does not match the non-contiguous TE located, the TLB logic is further configured to configure the result to represent a TLB miss.

13. The circuit of claim 1, wherein the tag includes a contiguous parameter setting, wherein a hash value of the hash values of the plurality of hash values computed includes a first hash portion and second hash portion, wherein the TLB logic is further configured to use the second hash portion as an index for locating the contiguous TE and wherein, in an event the tag does not match the contiguous TE located and does not match the non-contiguous TE located, the TLB logic is further configured to:

configure the result to represent a TLB miss; and based on the contiguous parameter setting and the first hash portion, a) block a write to insert an entry at the contiguous TE located and allow the write to insert the entry at the non-contiguous TE located or b) block the write to insert the entry at the non-contiguous TE located and allow the write to insert the entry at the contiguous TE located.

14. The circuit of claim 1, wherein TLB banks of the plurality of TLB banks are random-access memories (RAMs) of a size $2^n$, or a respective combination of RAMs which, in combination, are of the size $2^n$, wherein the hash values of the plurality of hash values computed includes a first hash value computed and second hash value computed, and wherein the first hash value computed is an (n+1)-bit value and the second hash value computed is an n-bit value.

15. The circuit of claim 1, wherein the hash values of the plurality of hash values computed include a first hash value computed and a second hash value computed and wherein the TLB logic is further configured to:

locate the contiguous TE within a TLB bank of the plurality of TLB banks based on the first hash value computed; and locate the non-contiguous TE within another TLB bank of the plurality of TLB banks based on the second hash value computed and at least a portion of the first hash value computed.

16. The circuit of claim 1, wherein the TLB logic is further configured to:

associate a hash function with the contiguous TE;

compute a hash value, of the hash values of the plurality of hash values computed, using the hash function;

utilize a TLB bank of the plurality of TLB banks to locate the contiguous TE based on a portion of the hash value computed; and utilize another TLB bank of the plurality of TLB banks to locate the non-contiguous TE based on the portion of the hash value computed.

17. A method comprising:

computing a plurality of hash values of a tag included in a memory request;

locating, based on hash values of the plurality of hash values computed, a contiguous translation entry (TE) and a non-contiguous TE in different translation lookaside buffer (TLB) banks of a plurality of TLB banks;

determining a result by comparing the tag with the contiguous TE located and by comparing the tag with the non-contiguous TE located; and outputting the result determined toward servicing the memory request.

18. The method of claim 17, wherein the hash values of the plurality of hash values computed are mathematically uncorrelated values.

19. The method of claim 17, further comprising producing the hash values of the plurality of hash values computed using respective hash functions and wherein the respective hash functions are mathematically uncorrelated.

20. The method of claim 17, further comprising locating the contiguous TE and locating the non-contiguous TE, concurrently.

21. The method of claim 17, further comprising sharing a TLB bank of the plurality of TLB banks by contiguous and non-contiguous translation entries.

22. The method of claim 17, wherein the tag includes a memory address or the memory address and at least one identifier.

23. The method of claim 22, wherein the at least one identifier includes a virtual machine identifier of a virtual machine associated with the memory request, process identifier of a process associated with the memory request, or a combination thereof.

24. The method of claim 17, wherein the hash values of the plurality of hash values computed include a first hash value computed and a second hash value computed, wherein the first hash value computed is associated with the contiguous TE, wherein the second hash value computed is associated with the non-contiguous TE, and wherein a total number of bits of the first hash value computed is greater than a total number of bits of the second hash value computed.

25. The method of claim 17, further comprising:

computing a first hash value, of the hash values of the plurality of hash values computed, using a first hash function, the first hash value computed including a first hash portion and a second hash portion;

using the second hash portion as a contiguous TE index for locating the contiguous TE;

computing a second hash value using a second hash function, the second hash function mathematically uncorrelated with the first hash function;

using the second hash value computed as a non-contiguous TE index for locating the non-contiguous translation entry; and at a TLB bank of the plurality of TLB banks, selecting, based on the first hash portion, an index from the contiguous TE index and non-contiguous TE index, and locating an entry, within the TLB bank, referenced by the index selected, the contiguous TE entry corresponding to the entry located in an event the index selected is the contiguous TE index, the non-contiguous TE entry corresponding to the entry located in an event the index selected is the non-contiguous TE index.

26. The method of claim 25, wherein:
in an event the tag matches the contiguous TE located, the method further comprises outputting the contiguous TE located and configuring the result to represent a TLB hit;
in an event the tag matches the non-contiguous TE located, the method further comprises outputting the non-contiguous TE located and configuring the result to represent the TLB hit; and
in an event the tag does not match the contiguous TE located and does not match the non-contiguous TE located, the method further comprises configuring the result to represent a TLB miss.

27. The method of claim 25, wherein the tag includes a contiguous parameter setting, wherein a hash value of the hash values includes a first hash portion and second hash portion, wherein the method further comprises using the second hash portion as an index for locating the contiguous TE and wherein, in an event the tag does not match the contiguous TE located and does not match the non-contiguous TE located, the method further comprises:
configuring the result to represent a TLB miss; and
based on the contiguous parameter setting and the first hash portion, a) blocking a write to insert an entry at the contiguous TE located and allowing the write to insert the entry at the non-contiguous TE located or b) blocking the write to insert the entry at the non-contiguous TE located and allowing the write to insert the entry at the contiguous TE located.

28. The method of claim 17, further comprising:
computing a first hash value of the hash values using a first hash function, the first hash value computed including a first hash portion and a second hash portion;
computing a second hash value of the hash values using a second hash function;
selecting, based on the first hash portion, between a) using the second hash portion of the first hash value computed to locate the contiguous TE within a TLB bank of the plurality of TLB banks and b) using the second hash value computed to locate the non-contiguous TE within the TLB bank.

29. The method of claim 17, wherein TLB banks of the plurality of TLB banks are random-access memories (RAMs) of a size $2^n$, or a respective combination of RAMs which, in combination, are of the size $2^n$, wherein the hash values of the plurality of hash values computed include a first hash value computed and second hash value computed, and wherein the first hash value computed is an (n+1)-bit value and the second hash value computed is an n-bit value.

30. The method of claim 17, wherein the hash values of the plurality of hash values computed include a first hash value computed and a second hash value computed and wherein the method further comprises:
locating the contiguous TE within a TLB bank of the plurality of TLB banks based on the first hash value computed; and
locating the non-contiguous TE within another TLB bank of the plurality of TLB banks based on the second hash value computed and at least a portion of the first hash value computed.

31. The method of claim 17, further comprising:
associating a hash function with the contiguous TE
computing a hash value, of the hash values of the plurality of hash values computed, using the hash function;
utilizing a TLB bank of the plurality of TLB banks to locate the contiguous TE based on a portion of the hash value computed; and
utilizing another TLB bank of the plurality of TLB banks to locate the non-contiguous TE based on the portion of the hash value computed.

32. An apparatus comprising:
means for computing a plurality of hash values of a tag included in a memory request;
means for locating, based on hash values of the plurality of hash values computed, a contiguous translation entry (TE) and a non-contiguous TE in different translation lookaside buffer (TLB) banks of a plurality of TLB banks;
means for determining a result by comparing the tag with the contiguous TE located and by comparing the tag with the non-contiguous TE located; and
means for outputting the result determined toward servicing the memory request.

* * * * *